US012601395B2

(12) United States Patent
Steffens et al.

(10) Patent No.: US 12,601,395 B2
(45) Date of Patent: Apr. 14, 2026

(54) ELECTRIC AXLE DRIVE FOR AN AXLE OF A MOTOR VEHICLE, IN PARTICULAR OF AN AUTOMOBILE, AND A MOTOR VEHICLE, IN PARTICULAR AN AUTOMOBILE

(71) Applicant: DAIMLER TRUCK AG, Leinfelden-Echterdingen (DE)

(72) Inventors: Frank Steffens, Ostfildern (DE); Jens Luckmann, Winnenden (DE); Marc Strölin, Neuhausen (DE); Marc Klein, Denkendorf (DE); Florian Vincon, Stuttgart (DE)

(73) Assignee: DAIMLER TRUCK AG, Leinfelden-Echterdingen (DE)

( * ) Notice: Subject to any disclaimer, the term of this patent is extended or adjusted under 35 U.S.C. 154(b) by 9 days.

(21) Appl. No.: 18/711,936

(22) PCT Filed: Nov. 21, 2022

(86) PCT No.: PCT/EP2022/082600
§ 371 (c)(1),
(2) Date: May 21, 2024

(87) PCT Pub. No.: WO2023/089171
PCT Pub. Date: May 25, 2023

(65) Prior Publication Data
US 2025/0020197 A1 Jan. 16, 2025

(30) Foreign Application Priority Data
Nov. 22, 2021 (DE) ..................... 10 2021 005 765.1

(51) Int. Cl.
*B60K 1/02* (2006.01)
*F16H 37/08* (2006.01)
(Continued)

(52) U.S. Cl.
CPC ......... *F16H 48/36* (2013.01); *F16H 37/0806* (2013.01); *F16H 48/10* (2013.01); *F16H 2048/364* (2013.01)

(58) Field of Classification Search
CPC ...... F16H 48/36; F16H 37/0806; F16H 48/10; F16H 2048/364; F16H 2048/366; B60K 2001/001; B60K 1/02; B60K 6/365
See application file for complete search history.

(56) References Cited

U.S. PATENT DOCUMENTS 5,845,732 A 12/1998 Taniguchi
9,664,261 B1 5/2017 Linton
(Continued)

FOREIGN PATENT DOCUMENTS

DE 19741207 A1 4/1998
DE 102011102749 A1 11/2012
(Continued)

OTHER PUBLICATIONS

International Search Report for PCT/EP2022/082600 mailed on Feb. 13, 2023.

*Primary Examiner* — Tisha D Lewis
(74) *Attorney, Agent, or Firm* — Dennemeyer & Associates LLC

(57) ABSTRACT

An electric axle drive (10) for an axle (16) of a motor vehicle is provided for use on two vehicle wheels (12, 14). The electrical axle drive has an electric machine (18) having a stator (20) and a rotor (22), and a gear set such that torque, is provided by the rotor (22), and is introduced into the planetary gear set (26) and a first output shaft (36), for driving one of the vehicle wheels (12, 14). A second output shaft (40), from which the other vehicle wheel (14) can be driven, is connected in a torque-transmitting manner to the planet carrier (32) as the second output (42) of the planetary gear set (26), via the outputs (38, 42). The respective output
(Continued)

torques resulting from the respective drive torques can be dissipated from the planetary gear set (26) for driving the vehicle wheels (12, 14).

9 Claims, 6 Drawing Sheets

(51) Int. Cl.
  *F16H 48/10*     (2012.01)
  *F16H 48/36*     (2012.01)

(56)         References Cited

U.S. PATENT DOCUMENTS

| | | | |
|---|---|---|---|
| 2015/0152947 A1 | 6/2015 | Smetana | |
| 2018/0099561 A1 * | 4/2018 | Xu | B60L 15/32 |
| 2019/0072168 A1 * | 3/2019 | Yamamura | B60K 1/00 |

FOREIGN PATENT DOCUMENTS

| | | | |
|---|---|---|---|
| DE | 102012110269 A1 | 4/2014 | |
| DE | 102012220971 A1 * | 5/2014 | B60K 17/16 |
| DE | 112017000856 T5 | 11/2018 | |
| DE | 102017128448 A1 | 6/2019 | |
| DE | 102019205750 A1 | 10/2020 | |
| FR | 3080069 A1 | 10/2019 | |
| JP | H08-282314 A | 10/1996 | |
| JP | H10-119596 A | 5/1998 | |
| JP | 2009144757 A * | 7/2009 | B60K 17/02 |
| WO | 2020216504 A1 | 10/2020 | |

* cited by examiner

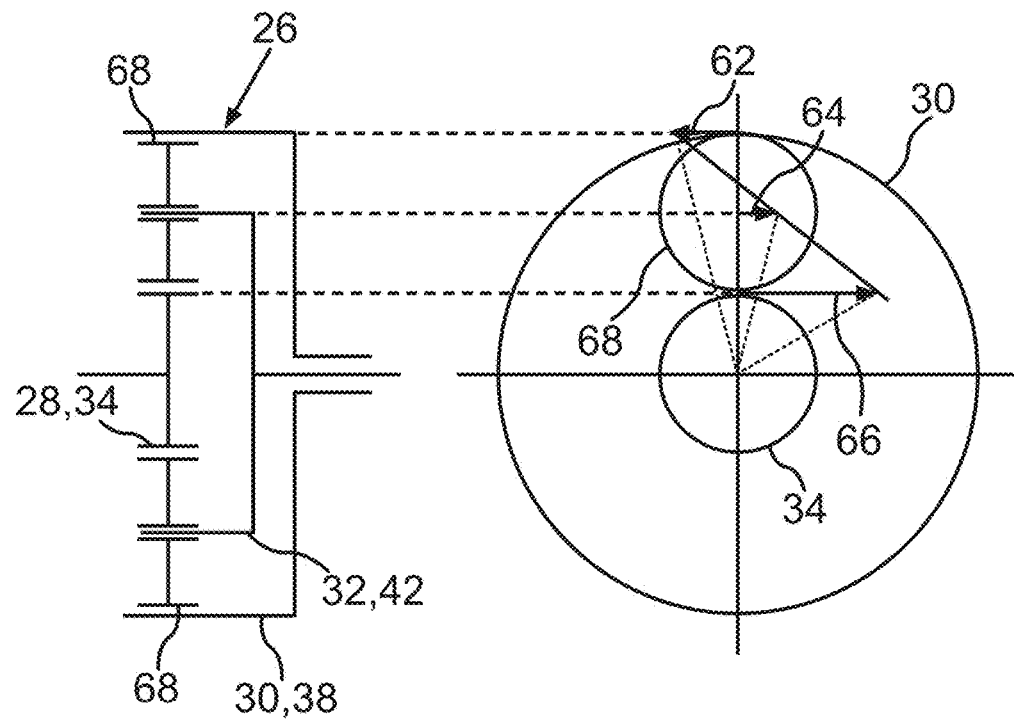
Fig.3
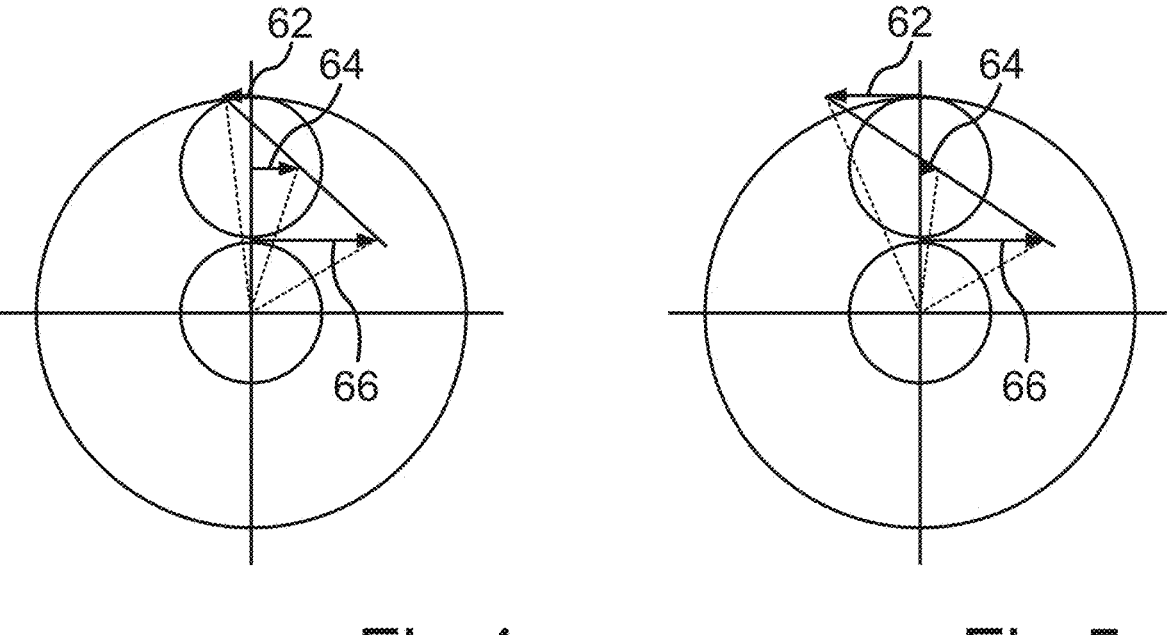
Fig.4                 Fig.5

ELECTRIC AXLE DRIVE FOR AN AXLE OF A MOTOR VEHICLE, IN PARTICULAR OF AN AUTOMOBILE, AND A MOTOR VEHICLE, IN PARTICULAR AN AUTOMOBILE

CROSS-REFERENCE TO RELATED APPLICATIONS

This is a 35 U.S.C. 371 National Stage Patent Application of International Application No. PCT/EP2022/082600, filed Nov. 21, 2022, which claims priority to German application 10 2021 005 765.1, filed Nov. 22, 2021, each of which is hereby incorporated by reference in its entirety.

BACKGROUND OF THE INVENTION

The invention relates to an electric axle drive for an axle of a motor vehicle, in particular an automobile, in accordance with the generic term of patent claim 1. Furthermore, the invention relates to a motor vehicle, in particular an automobile, with at least one such electric axle drive.

DE 10 2019 205 750 A1 discloses a gear unit as known, comprising an input shaft, a first output shaft, a second output shaft, a first planetary gear set and a second planetary gear set connected to the first planetary gear set. A drive train for an electric vehicle is known from U.S. Pat. No. 5,845, 732. In addition, WO 2020/216504 A1 discloses a gear unit.

Furthermore, DE 10 2011 102 749 A1 shows a transmission arrangement with an electric machine and a transmission device with two spur-toothed planetary gears. Such a transmission arrangement is also known from US 2015/0 152 947 A1.

In addition, DE 10 2017 128 448 A1 discloses a differential for a motor vehicle with a drive element and two output elements, wherein the drive element is connected to the first output element via a first power splitter and to the second output element via a second power splitter, and wherein a speed difference between the two power splitters is made possible.

DE 10 2012 110 269 A1 shows a drive train of an electric motor vehicle, which has an electric machine and a gear unit with two transmission output shafts, which are assigned to a vehicle axle.

BRIEF SUMMARY OF THE INVENTION

The object of the present invention is to provide an electric axle drive for a motor vehicle and a motor vehicle with at least one such electric axle drive, so that a particularly advantageous drive of the motor vehicle can be realized in a particularly space- and weight-saving manner.

This object is achieved by an electric axle drive with the features of patent claim 1 and by a motor vehicle with the features of patent claim 9. Advantageous embodiments with useful further embodiments of the invention are described in the remaining claims.

A first aspect of the invention relates to an electric axle drive for an axle of a motor vehicle, in particular an automobile, comprising at least or exactly two vehicle wheels, also referred to as a vehicle axle. This means that the motor vehicle, which is preferably designed as an automobile, in particular as a commercial vehicle, has in its completely manufactured state the said axle and the said vehicle wheels of the axle as well as the electric axle drive, which is also referred to as electric drive unit, electric drive device or electric drive system. The vehicle wheels of the axle can be driven electrically, in particular purely electrically, by means of the electric axle drive, whereby the motor vehicle as a whole can be driven electrically, in particular purely electrically. The vehicle wheels that can be driven by means of the electric drive system, which are also simply referred to as wheels, are also referred to as driven vehicle wheels, drivable vehicle wheels, driven wheels or drivable wheels. Unless otherwise specified, when the term "vehicle wheels" is used in the following, it refers to the drivable vehicle wheels. The vehicle wheels are ground contact elements of the motor vehicle, which can be supported or braced on the ground via the ground contact elements in the vertical direction of the vehicle. If the motor vehicle is driven along the ground, for example by means of the electric axle drive, while the vehicle is supported on the ground via the ground contact elements (vehicle wheels) in the upward direction of the vehicle, the vehicle wheels roll, in particular directly, on the ground. The vehicle wheels are also referred to as the first wheels or first vehicle wheels, and the axle is also referred to as the first axle or first vehicle axle. For example, in its fully manufactured state, the motor vehicle has at least or exactly two axles arranged sequentially and thus one behind the other in the longitudinal direction of the vehicle, namely the first axle and at least one further axle. The further axle, for example, thereby has at least or exactly two further vehicle wheels, which are further ground contact elements. The vehicle wheels are preferably arranged on opposite sides of the axle and thus of the motor vehicle in the transverse direction of the vehicle. Accordingly, the other vehicle wheels are preferably also arranged on opposite sides of the axle and thus of the motor vehicle in the transverse direction of the vehicle.

The electric axle drive has at least one electric machine, which is also referred to as the first electric machine, electric motor or first electric motor. The first electric machine has a stator, which is also referred to as the first stator. Furthermore, the electric machine has a rotor, which is also referred to as the first rotor. In particular, the rotor can be driven by means of the stator and can therefore be rotated about a machine's axis of rotation of the electric machine relative to the stator. In particular, the electric machine can provide drive torques via its rotor to drive the vehicle wheels. The electric axle drive also has, in particular exactly, one planetary gear set, which has, in particular exactly, one ring gear, in particular exactly, one planet carrier and, in particular exactly, one sun gear as, in particular the only drive unit for the planetary gear set. In other words, the sun gear, also referred to simply as the sun, is a drive, in particular the only drive, of the planetary gear set, whereby the drive torques that can be provided by the rotor for driving the vehicle wheels can be introduced into the planetary gear set via the drive, i.e., via the sun gear of the planetary gear set. In particular, the planetary gear set is designed as a simple planetary gear set. The planet carrier is also referred to as the spider. For example, the planetary gear set has planet gears which are rotatably mounted on the planet carrier. The respective planet gear meshes with the sun gear and, in particular simultaneously, with the ring gear, whereby preferably the sun gear does not mesh with the ring gear, the planet gears are designed as unstepped planet gears. The planet gears form a set of planet gears. As will be explained in more detail below, the vehicle wheels can be driven by the rotor and thus by the electric machine, in particular by means of the respective drive torque, via the planetary gear set.

In order to now be able to realize a particularly advantageous drive of the vehicle wheels and thus of the motor vehicle in a particularly weight- and space-saving manner, the electric axle drive has a first output shaft, from or by means of which a first of the vehicle wheels can be driven. For example, the vehicle wheels are components of the axle drive. For example, the first output shaft can be or is connected to the first vehicle wheel in a torque-transmitting, in particular torsionally rigid, manner. In particular, for example, the first output shaft is permanently connected to the first vehicle wheel in a torque-transmitting manner. The first output shaft, from which the first vehicle wheel can be driven, is connected, in particular permanently, in a torque-transmitting manner to the ring gear, which is a first output of the planetary gear set belonging to or associated with the first output shaft. The electric axle drive also comprises a second output shaft from which the second vehicle wheel can be driven. For this purpose, for example, the second output shaft is in particular permanently connected to the second vehicle wheel in a torque-transmitting, in particular torsionally rigid, manner. Furthermore, it is conceivable that the second output shaft can be connected to the second vehicle wheel in a torque-transmitting, in particular torsionally rigid, manner. It is therefore conceivable that the first output shaft is connected to the first vehicle wheel in a torque-transmitting, in particular permanently, and in particular in a torsionally rigid manner. Furthermore, it is conceivable that the first output shaft can be connected to the first vehicle wheel in a torque-transmitting, in particular torsionally rigid, manner. The second output shaft, from which the second vehicle wheel can be driven, is connected to the planet carrier of the planetary gear set in a torque-transmitting manner, in particular permanently. The planet carrier is designed as a second output of the planetary gear set, whereby the second output belongs to the second output shaft, and therefore belongs to or is associated with the second output shaft. In other words, the first output is assigned to the first output shaft, so that the first output belongs to the first output shaft. The second output is assigned to the second output shaft, so that the second output belongs to the second output shaft. The respective output torques resulting from the respective drive torques for driving the vehicle wheels can be transferred from the planetary gear set via the outputs of the planetary gear set. In particular, it is conceivable that the planetary gear set has exactly two outputs, namely the first output in the form of the ring gear and the second output in the form of the planet carrier. In particular, the respective output torques resulting from the respective drive torques introduced into the planetary gear set via its drive can thereby be discharged, i.e., transferred, from the planetary gear set via the output drives of the planetary gear set, i.e., provided by the planetary gear set. In particular, it is conceivable that the planetary gear set has exactly one drive, namely the aforementioned drive in the form of the sun gear, whereby, for example, the drive torques can be introduced into the planetary gear set, in particular exclusively, via the drive of the planetary gear set.

Furthermore, according to the invention, it is provided that, in particular exactly one of the output shafts is connected to the output of the planetary gear set belonging to the one output shaft via an intermediate element, in particular permanently, in a torque-transmitting manner, by means of which a reversal of the direction of rotation of the one output shaft can be effected relative to the output of the planetary gear set belonging to the one output shaft. This is to be understood in particular as follows. If the electric machine provides the respective drive torque via its rotor, which is introduced into the planetary gear set via the drive, the planetary gear set and in particular its outputs are driven.

The drive is driven by the rotor, and the drive drives the outputs. The drive, i.e., the sun gear, and the outputs, i.e., the ring gear and the planet carrier, are transmission elements of the planetary gear set. The respective transmission element can be rotated about a respective planetary gear set axis of rotation relative to the housing, in particular when the respective transmission element is not connected to a housing of the electric axle drive in a torsionally rigid manner, in particular when the planetary gear set is driven. For example, the planetary gear set is thereby arranged in the housing. It is thereby preferably provided that the transmission elements are arranged coaxially to one another so that the planetary gear set axes of rotation coincide. If the planetary gear set and thus the outputs are now driven, in particular via the drive, the outputs rotate, in particular together or simultaneously and/or at the same angular velocity and/or rotational speed, about the planetary gear set axis of rotation, in particular relative to the housing. The outputs thereby rotate in opposite directions. This means, for example, that the first output rotates in a first direction of rotation about the planetary gear set axis of rotation relative to the housing, while the second output rotates in a second direction of rotation about the planetary gear set relative to the housing, the second direction of rotation being opposite to the first direction of rotation. If, for example, the first output and the first output shaft were to rotate in the same direction and the second output and the second output shaft were to rotate in the same direction, the output shafts, which are arranged coaxially to each other, would rotate in opposite directions, so that the vehicle wheels would also rotate in opposite directions, for example. However, this can now be avoided by the intermediate element in such a way that the one output shaft and the output belonging to the one output shaft rotate in opposite directions. Consequently, the output shafts rotate in the same direction, i.e., in the same direction of rotation, and in particular about an output shaft axis of rotation common to the output shafts relative to the housing of the electric axle drive, in particular when the planetary gear set is driven. It is thus preferably provided that the electric axle drive is designed so that when the planetary gear set and thus the outputs are driven via the drive unit, the outputs rotate in opposite directions, while the output shafts rotate in the same direction, in particular in that the intermediate element can be used to reverse the direction of rotation of the one output shaft relative to the output of the planetary gear set belonging to the one output shaft, i.e., to bring about the aforementioned reversal of the direction of rotation of the one output shaft.

Furthermore, in the invention, the planetary gear set, which is also referred to as a planetary gear and designed as a planetary gear, which is also referred to simply as a planetary set, functions as a differential gear, and thus as a differential, which is also referred to as an axle differential. The planetary gear set designed or functioning as a differential thereby has the function already sufficiently known from the general prior art that the respective drive torque provided by the electric machine via its rotor is transmitted, in particular divided or split, by means of the planetary gear set to the drives and thus to the output shafts also referred to as side walls and designed as side walls, in particular in such a way that the respective drive torque results in the respective output torque. In addition, the planetary gear set allows the vehicle wheels to rotate at different speeds, for example when the motor vehicle is cornering, in particular such that the vehicle wheel on the outside of the bend rotates or can rotate at a higher speed or the vehicle wheel on the inside of the bend, in particular while the vehicle wheels can be or are driven by the rotor via the planetary gear set, i.e., are connected to the rotor in a torque-transmitting manner.

In the context of the present disclosure, the feature that two components are connected to one another in a torsionally rigid manner is to be understood to mean that the components connected to one another in a torsionally rigid manner are arranged coaxially to one another and, in particular when the components are driven, rotate together or simultaneously about a component axis of rotation common to the components at the same angular speed, in particular relative to the housing. The feature that two components are connected to each other in a torque-transmitting manner means that the components are coupled to each other in such a way that torques can be transmitted between the components, whereby if the components are connected to each other in a torsionally rigid manner, the components are also connected to each other in a torque-transmitting manner. The feature that two components are permanently connected to each other in a torque-transmitting manner means that a switching element is not provided which can be switched between a coupling state connecting the components to each other in a torque-transmitting manner and a decoupling state in which no torques can be transmitted between the components, but the components are always or permanently connected to each other in a torque-transmitting manner, i.e., in such a way that a torque can be transmitted between the components. This means, for example, that one of the components can be driven by the other component and vice versa. In particular, the feature that the components or structural elements are permanently connected to each other in a torsionally rigid manner means that a switching element is not provided which can be switched between a coupling state connecting the components or structural elements to each other in a torsionally rigid manner and a decoupling state in which the components or structural elements are decoupled from each other and can be rotated relative to each other, but rather the components or structural elements are always or permanently connected or coupled to each other. The feature that two components can be connected or coupled to one another in a torsionally rigid or torque-transmitting manner means, in particular, that the components are assigned a switching element which can be switched between at least one coupled state and at least one decoupled state. In the coupled state, the components are connected to each other in a torsionally rigid or torque-transmitting manner by means of the switching element. In the decoupled state, the components are decoupled from each other so that in the decoupled state the components can be rotated relative to each other, in particular about the component axis of rotation, or no torques can be transmitted between the components.

The invention is based in particular on the following findings and considerations: In the case of electric drive units, it is advantageous if the speed of the rotor and thus of the electric machine is reduced to a wheel speed that is lower than the speed at which, for example, the respective output shaft and/or the respective vehicle wheel rotates. Typically, gear unit stages are used for this purpose, particularly in the form of planetary sets and/or gear stages, especially spur gear stages. In order to achieve speed compensation between the vehicle wheels, i.e., to allow different speeds between different vehicle wheels, differentials are usually used, which are designed as bevel differentials, for example, whereby the differentials are usually used in addition to the gear stages. The invention now makes it possible, in particular by using the intermediate element, to use the planetary gear set both as a differential, which permits or effects a speed compensation between the vehicle wheels, and as a gear stage or gear unit, by means of which, for example, a rotational speed of the drive unit, which rotates in particular with the rotational speed, in particular about the planetary gear set axis of rotation and/or relative to a housing, can be changed, in particular reduced, to a wheel speed which is different from the rotational speed, in particular lower, when the planetary gear set is driven, at which the respective output and thereby, in particular, the respective output shaft and thereby, for example, the respective vehicle wheel rotates. Thus, a respective gear ratio is preferably provided from the drive unit to the respective output of the planetary gear set. This means that the use of an additional differential can be avoided, so that the number of parts, the weight, the costs and the installation space requirement of the electric axle drive can be kept to a particularly low level. In particular, it is provided that the rotor is connected to the drive unit in a torsionally rigid manner, in particular permanently. Furthermore, it is conceivable that the planetary gear set has a first gear ratio when viewed from the drive unit towards the first output and a second gear ratio when viewed from the drive unit towards the second output, the first gear ratio and the second gear ratio preferably being the same. Furthermore, a third gear ratio in particular is provided, for example, from the output belonging to the one output shaft via the intermediate element to the one output shaft, with the third gear ratio preferably being 1. In particular, the electric axle drive is designed so that when the drive unit rotates at a respective drive speed, in particular about the planetary gear set axis of rotation and/or relative to the housing, the output shafts rotate, in particular together or simultaneously, at the same output shaft speed and in particular in the same direction, in particular relative to the housing and/or relative to one of the output shaft axes of rotation common to the output shafts.

The rotor of the electric machine is, for example, connected to the drive unit in particular in a permanent, torque-transmitting and in particular torsionally rigid manner. Furthermore, it is conceivable that the rotor can be connected to the drive unit in a torque-transmitting, in particular torsionally rigid, manner. This means that the electric machine, also referred to as the electric motor, is or can be connected to the planetary gear set, also known simply as the planetary set, via the drive unit, i.e., via the sun gear. The planet carrier, also referred to simply as the carrier, and the ring gear are used as the outputs of the planetary gear set, in particular at the same time.

Thus, for example, while one output shaft and the output belonging to the one output shaft rotate in opposite directions, it is provided, for example, that the other output shaft and the output belonging to the other output shaft rotate in the same direction, so that preferably the direction of rotation of the other output shaft is not reversed relative to the output of the planetary gear set belonging to the other output shaft. For example, the second output is connected to the second output shaft in a torque-transmitting manner, in particular permanently, whereby it is conceivable in particular that the second output is connected to the second vehicle wheel in a torque-transmitting manner, in particular permanently, via the second output shaft. Furthermore, it is conceivable that the first output is connected to the first output shaft in a torque-transmitting manner, in particular permanently, whereby it is conceivable in particular that the first output is coupled to the first vehicle wheel in a torque-transmitting manner, in particular permanently, like the first output shaft. The outputs are also referred to as output sides, so that the intermediate element and thus the reversal of direction of rotation moved or movable by the intermediate element are assigned to one of the output sides. Consequently, the two outputs drive in the same direction of rotation. In other words, the outputs drive the output shafts and thus in particular also the vehicle wheels in such a way that the output shafts and thus in particular also the vehicle wheels rotate, in particular together or simultaneously, in the same direction of rotation.

In particular, it is preferably provided that an overall gear ratio viewed from the drive unit via the first output up to the first output shaft, in particular up to the first vehicle wheel, and a second overall gear ratio viewed from the drive unit via the second output up to the second output shaft, in particular up to the second vehicle wheel, are matched to one another in such a way, in particular are the same, that the output shafts, in particular the vehicle wheels, rotate at the same speed, also referred to as the output speed, in particular in the same direction, when the drive unit rotates or is driven at a respective speed, also referred to as the drive speed, wherein it is preferably provided that the respective output speed is less than that of the drive speed.

By using the planetary gear set both as a differential and as a gear unit, in particular for speed reduction, a particularly strong, particularly advantageous speed reduction can be realized in a space-saving, weight-saving and cost-effective manner, so that no additional gear stage may be required, for example between the respective vehicle wheel and the respective output shaft. In particular, a gear ratio of 5 to 10 can be realized, for example, by using only one planetary gear set. The invention is particularly advantageous as a transverse drive, i.e., as a transverse installation, so that, for example, when the motor vehicle is fully assembled, the planetary gear set axis of rotation and/or the machine's axis of rotation run in the transverse direction of the vehicle, i.e., parallel to the transverse direction of the vehicle. In particular, it is preferably provided that the machine's axis of rotation coincides with the planetary gear set axis of rotation, so that the electric machine can be arranged coaxially to the planetary gear set. Furthermore, the invention makes it possible for transverse forces of gear wheels, in particular drive wheels, to cancel each other out, in particular in the planetary gear set, so that a particularly advantageous bearing and a compact design can be realized. Furthermore, the invention enables the precise adjustment of individual gear ratios to the vehicle wheels, whereby an optimized load distribution can be achieved compared to conventional solutions, in particular with regard to a longitudinal differential with a different number of axles between a front axle and a rear axle of the motor vehicle.

In order to thereby realize a particularly advantageous drive unit in a particularly weight-, space- and cost-saving manner, it is further provided according to the invention that the second rotor of the second electric machine can be connected to the intermediate element in a torque-transmitting, in particular torsionally rigid, manner by means of the switching element, bypassing the drive unit of the planetary gear set. If the second rotor then provides the respective second drive element, the drive unit is not arranged in the torque flow or at least not in the torque flow between the second rotor and the intermediate gear in relation to a torque flow along which the respective second drive torque can be transmitted from the second rotor to the intermediate element. This torque-transmitting, in particular torsionally rigid, connection of the second rotor to the intermediate element by means of the switching element enables, for example, the aforementioned torque distribution function to be realized, and thus the counter-rotation of the output shafts.

In an advantageous embodiment of the invention, the intermediate element is designed as an intermediate gear, which makes it possible to achieve a particularly lightweight and cost-effective design.

A further embodiment is characterized by the fact that the one output shaft is connected in a torque-transmitting manner, in particular permanently, to the output of the planetary gear set belonging to the one output shaft via, in particular exactly or at least, a first spur gear stage. It is also thereby preferably provided that the other output shaft is connected in a torque-transmitting manner, in particular permanently, to the output of the planetary gear set belonging to the other output shaft via, in particular at least or exactly, a second spur gear stage. This enables a particularly compact design, as in particular the length of the electric axle drive running in the axial direction of the planetary gear set can be kept particularly short. In addition, an advantageous gear ratio can be realized here in a particularly compact manner, in particular from the drive unit via the respective output to the respective output shaft, in particular to the respective vehicle wheel.

In order to be able to realize the reversal of the direction of rotation described above in a particularly space-saving, weight-saving and cost-effective manner, it is provided in a further embodiment of the invention that the first spur gear stage has a first spur gear that is, in particular permanently, torque-transmitting, in particular torsionally rigid, connected to the output of the planetary gear set belonging to the one output shaft, and the intermediate gear as the second spur gear, which meshes with the first spur gear. The second spur gear (intermediate gear) also meshes with a third spur gear of a third spur gear stage, which comprises the second spur gear (intermediate gear) and the third spur gear, and which is connected to the one output shaft in a torque-transmitting, in particular permanent, in particular torsionally rigid manner. The one output shaft is connected via the third spur gear stage, in particular permanently, in a torque-transmitting manner to the output of the planetary gear set belonging to the one output shaft. In other words, in this embodiment, the one output shaft is connected via the third spur gear stage, in particular permanently, in a torque-transmitting manner, to the second spur gear stage and thus to the output belonging to the one output shaft, the third spur gear stage being connected via the first spur gear stage, in particular permanently, in a torque-transmitting manner, to the output belonging to the one output shaft. This allows the direction of rotation to be reversed and a particularly advantageous gear ratio to be achieved in a particularly space-saving manner.

In order to be able to realize a particularly advantageous drivability of the motor vehicle, in a further embodiment of the invention, a second electric machine is provided in addition to the electric machine, which has a second stator and a second rotor. The second electric machine can provide second drive torques via the second rotor. In particular, the second rotor can be driven by means of the second stator and thereby rotated about a second machine's axis of rotation relative to the second stator. It is conceivable that the electric machines and thus the rotors are arranged coaxially to each other so that the machine's axes of rotation coincide.

A further embodiment is characterized by the fact that the second rotor can be or is connected to the drive unit of the planetary gear set in a torque-transmitting, in particular torsionally rigid, manner. It is therefore conceivable that the second rotor is connected to the drive unit of the planetary gear set in a torque-transmitting, in particular permanently, and in particular in a torsionally rigid manner. The second drive torques that are or can be provided by the second rotor and thus by the second electric machine can be introduced into the planetary gear set via the drive unit of the planetary gear set. The previous and following explanations with regard to the first electric machine and the planetary gear set are thereby readily transferable to the second electric machine and the planetary gear set and vice versa. In particular, if the second drive torques are introduced into a planetary gear set via the drive unit, the output shafts and thus the vehicle wheels can be driven, in particular simultaneously, by means of both electric machines, so that a particularly powerful drive unit can be provided in a particularly space-saving manner.

For example, the first electric motor can provide the respective first drive torque and, in particular, the second electric motor can provide the respective second drive torque at the same time. The first drive torque and the second drive torque are thus introduced, for example, in particular simultaneously, via the driven planetary gear set, so that the respective output torque results from the respective first drive torque and from the respective second drive torque. This makes it possible to create a particularly powerful drive in a space-saving manner.

In order to be able to realize a particularly advantageous and in particular demand-oriented operation or drive of the motor vehicle in a particularly cost-, space- and weight-saving manner, it is provided in a further embodiment of the invention that the electric axle drive is designed to operate one of the electric machines and thereby influence the planetary gear in such a way that when the output shafts are driven by the other electric machine, the output shafts rotate in the opposite direction. For example, the axle drive is designed to transmit the drive torques that can be or are provided by one of the rotors to at least or precisely one of the output shafts, in particular to introduce them into the planetary gear set, in such a way that when the vehicle wheels are moved by the other rotor, i.e., when the electric machine comprising the other rotor drives the vehicle wheels via the other rotor, the output shafts rotate in opposite directions and thus, in particular, the output shafts rotate in opposite directions. In other words, it is preferably provided that the electric axle drive can be operated in an operating mode in which the electric machine with the other rotor drives the drive unit and thus the planetary gear set and the output shafts and the vehicle wheels via the other rotor, whereby the one electric machine influences at least one of the output shafts in the operating mode, in particular via the planetary gear set, in such a way that the output shafts and thus preferably also the vehicle wheels rotate in opposite directions. Rotating the output shafts or the vehicle wheels in opposite directions means, for example, that one output shaft rotates in a first output shaft direction of rotation about the output shaft axis of rotation, while the other output shaft rotates about a second output shaft direction of rotation about the output shaft axis of rotation, the second output shaft direction of rotation being opposite to the first output shaft direction of rotation. As a result, a torque distribution function, i.e., a torque distribution, can be realized, whereby the torque distribution function is also referred to as a torque vectoring function or the torque distribution is also referred to as torque vectoring. The operating mode is therefore a torque distribution operating mode, which can be used, for example, for cornering or turning maneuvers of the vehicle with a particularly small turning circle. In particular, because the planetary gear set is designed as a planetary gear, one of the transmission elements, in particular one of the outputs, can, for example, be influenced by means of the one rotor in such a way that the outputs rotate, in particular with respect to each other and/or relative to each other, in such a way that this results in the output shafts rotating in opposite directions, in particular despite the intermediate element. This influencing of the one gear element is carried out, for example, in such a way that the respective drive torque that is or can be provided by the one rotor is transmitted, in particular directly, to the one gear element. This allows, for example, the one of the transmission elements, which is designed as one of the outputs, to be accelerated or decelerated relative to at least one other of the transmission elements, in particular relative to the output, which causes the output shafts to rotate in opposite directions. This embodiment of the invention is based in particular on the following findings and considerations:

Advantageously, a maximum turning circle of a motor vehicle should not be exceeded, in particular especially if the motor vehicle is designed as a truck. However, as the wheelbase increases, in particular for semitrailer tractors, this becomes increasingly difficult to maintain without using special measures such as a steered rear axle etc. In order to keep the turning circle sufficiently small, the brakes can be applied to the inside wheel of the vehicle, for example, but this can only keep the turning circle small to a limited extent. In order to now be able to keep the turning circle particularly small in a particularly space-saving manner, the other rotor or the electric machine with the other rotor can, for example, drive the planetary gear set and, via this, the output shafts and thus, for example, the vehicle wheels, whereby, for example, the one rotor and thus the electric machine with the one rotor can change or influence the load distribution or load splitting, i.e., a distribution or splitting of the respective drive torque provided by the other rotor, introduced into the planetary gear set and used to drive the output shafts, and in particular the vehicle wheels, to the output shafts, in particular to the outputs, in particular in such a way that the output shafts rotate in opposite directions, i.e., that compared to a normal operating mode in which, for example, both electric machines drive the output shafts simultaneously or only one of the electric machines drives the output shafts in such a way that the output shafts rotate in the same direction, a reversal of the direction of rotation is effected so that the output shafts rotate in opposite directions, that is, so that, for example, one of the output shafts, which rotates about the output shaft axis of rotation in the first output shaft direction of rotation in the normal operating mode, rotates in the second output shaft direction of rotation in the operating mode, wherein, for example, the other output shaft rotates in the first output shaft direction of rotation both in the normal operating mode and in the operating mode. For example, the direction of rotation of the first output shaft can be reversed or the direction of rotation of the second output shaft can be reversed, so that the direction of rotation of the vehicle wheel on the inside of the bend is reversed when cornering, for example. This means in particular that, for example, when cornering, the vehicle wheel on the inside of the bend is rotated backwards, in particular while the vehicle wheel on the outside of the bend is rotated forwards, whereby the turning circle can be kept particularly small. The fact that the respective vehicle wheel is rotated backwards means that a backward rotation of the respective vehicle wheel is carried out, the backward rotation of which is actually intended for reverse travel of the motor vehicle. This means that the vehicle can be moved backwards if the vehicle wheels are rotated backwards, especially simultaneously. This kind of reversal of the direction of rotation or reverse rotation of the vehicle wheel, particularly on the inside of the bend, is not possible with a conventional application of the brakes, so that the turning circle can be kept particularly small.

A further embodiment of the invention is characterized by a switching element by means of which the second rotor can be connected to the drive unit of the planetary gear set in a torque-transmitting manner, in particular in a torsionally rigid manner.

A second aspect of the invention relates to a motor vehicle preferably designed as an automobile, in particular as a commercial vehicle, which has at least one electric axle drive according to the first aspect of the invention. Advantages and advantageous embodiments of the first aspect of the invention are to be regarded as advantages and advantageous embodiments of the second aspect of the invention and vice versa.

Further advantages, features and details of the invention are apparent from the following description of preferred embodiments and from the drawing. The features and combinations of features mentioned above in the description as well as the features and combinations of features mentioned below in the description of the figures and/or shown alone in the figures can be used not only in the combination indicated in each case, but also in other combinations or on their own, without departing from the scope of the invention.

BRIEF DESCRIPTION OF THE SEVERAL VIEWS OF THE DRAWINGS

The drawing depicts as per:

FIG. 3 a schematic representation of a speed distribution when the motor vehicle is traveling straight ahead and is driven by the electric axle drive when traveling straight ahead;

FIG. 4 a schematic representation of a speed distribution when the motor vehicle is traveling around a left-hand bend, with the motor vehicle being driven by means of the axle drive;

FIG. 5 a schematic representation of a speed distribution when the motor vehicle is traveling around a right-hand bend, with the motor vehicle being driven by means of the axle drive;

Identical or functionally identical elements are marked with the same reference signs in the figures.

DETAILED DESCRIPTION OF THE INVENTION

Figure 1:
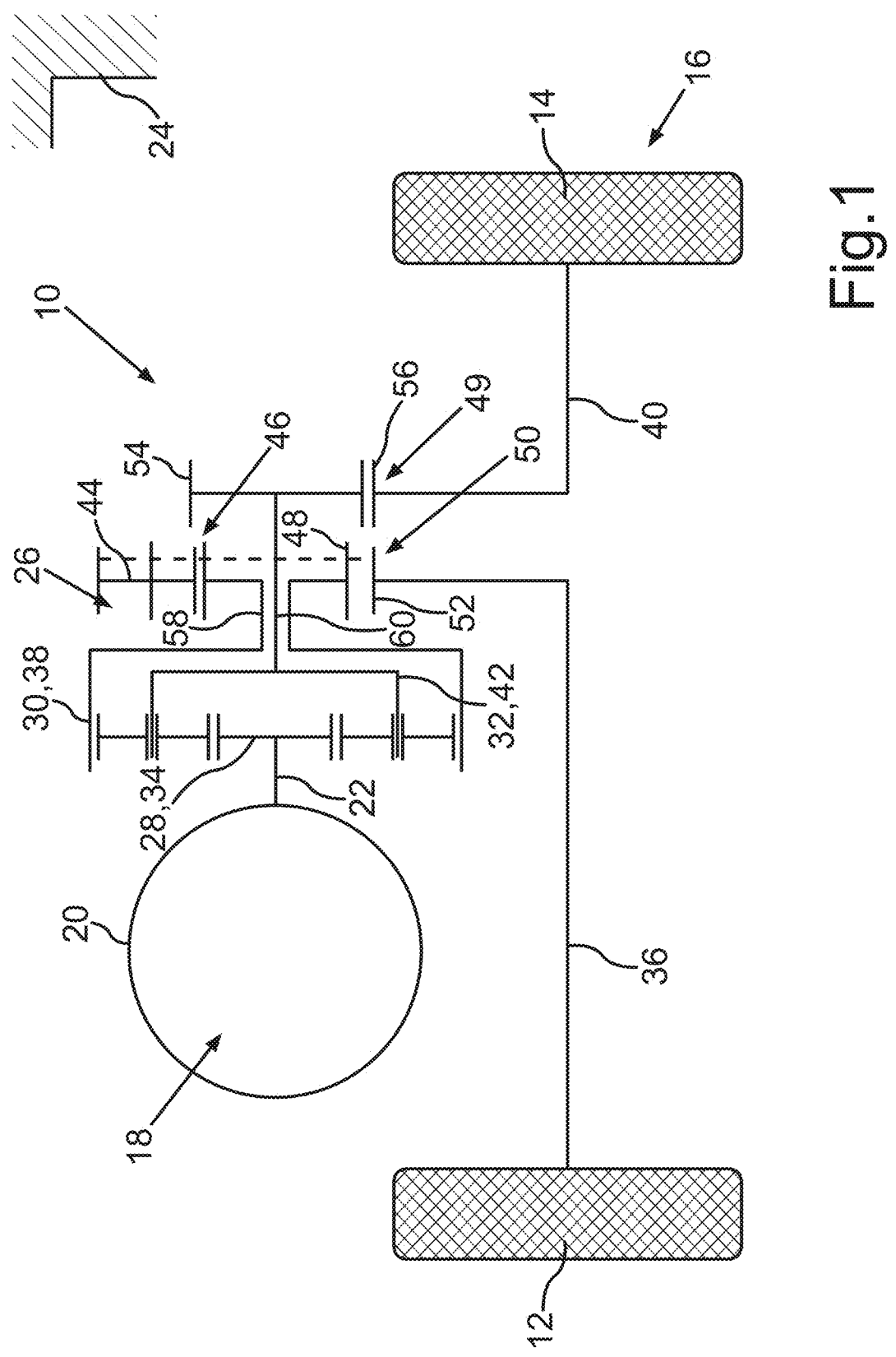
FIG. 1 a schematic representation of a first embodiment of an electric axle drive for a motor vehicle.

FIG. 1 shows a schematic representation of an electric axle drive 10 for an axle 16 of a motor vehicle, in particular an automobile, comprising at least or exactly two vehicle wheels 12 and 14. For example, the automobile is designed as a commercial vehicle. FIG. 1 shows a first embodiment of the axle drive 10. In the first embodiment, the axle drive 10 has, in particular exactly, one electric machine 18, which has a stator 20 and a rotor 22. The rotor 22 can be driven by means of the stator 20 and can thus be rotated, in particular about a first machine's axis of rotation, relative to a housing 24 of the axle drive 10, which is shown particularly schematically in FIG. 1. The axle drive 10 also has, in particular exactly, one planetary gear set 26, which is designed as a simple planetary gear set and is also referred to as a planetary set. The planetary gear set 26 has, in particular exactly, one sun gear 28. Furthermore, the planetary gear set 26 has, in particular exactly, one ring gear 30. The planetary gear set 26 also has, in particular exactly, a planet carrier 32, which is also referred to as a spider. The sun gear 28, the ring gear 30 and the planet carrier 32 are transmission elements of the planetary gear set 26, whereby the transmission elements can be rotated relative to the housing 24 about a planetary gear set axis of rotation. In the first embodiment, the electric machine 18 is arranged coaxially to the planetary gear set 26 so that the machine's axis of rotation coincides with the planetary gear set axis of rotation. The sun gear 28 is a drive unit of the planetary gear set 26, which in the first embodiment has exactly one drive unit, namely the drive unit designed as the sun gear 28. The drive unit is referred to as 34. Drive torques provided or made available by the rotor 22, i.e., by the electric machine 18 via the rotor 22, which are intended for driving the vehicle wheels 12 and 14, can be introduced into the planetary gear set 26 via the drive unit 34. The sun gear 28 is the first of the gear elements with respect to a torque flow via which the respective drive torque can be transmitted from the rotor 22 to the drive unit 34 and thus introduced into the planetary gear set 26, also referred to as the planetary gear, and is therefore arranged upstream of all the other gear elements of the planetary gear set 26.

In order to be able to realize a particularly advantageous drive unit of the motor vehicle in a particularly space-, weight- and cost-saving manner, the electric axle drive 10 has a first output shaft 36, from or by means of which the vehicle wheel 12, which is also referred to as the first vehicle wheel, can be driven. The first output shaft 36 is connected to the ring gear 30 in a torque-transmitting manner. The ring gear 30 is a first output 38 of the planetary gear set 26. Since the output shaft 36 can be driven by the ring gear 30, and thus by the output 38, in such a way that the ring gear 38 is connected to the output 38 in a torque-transmitting manner, in particular permanently, the output 38 belongs to the output shaft 36. The axle drive 10 has a second output shaft 40, from or by means of which the vehicle wheel 14, which is referred to as the second vehicle wheel, can be driven. For example, the vehicle wheel 12 is or can be connected, in particular permanently, to the output shaft 36 in a torque-transmitting manner, in particular in a torsionally rigid manner. Furthermore, the vehicle wheel 14 is or can be connected to the output shaft 40, for example, in a torque-transmitting manner, in particular permanently, and in particular in a torsionally rigid manner. The second output shaft 40 is connected to the planet carrier 32 in a torque-transmitting manner, in particular permanently, so that the output shaft 40 can be driven by the planet carrier 32. The planet carrier 32 is thus a second output 42 of the planetary gear set 26, which has exactly two outputs, namely the outputs 38 and 42. Since the output shaft 40 can be driven by the output 42, in particular by the fact that the output shaft 40 is connected to the output 42 in a torque-transmitting manner, in particular permanently, the output 42 belongs to the output shaft 40. The respective output torques resulting from the respective drive torques for driving the vehicle wheels 12 and 14 can be transferred from the planetary gear set 26 via the output drives 38 and 42, i.e., transferred out of the planetary gear set 26 (planetary gear). To put it in other words again, the planetary gear can provide the output torques via its output drives. It can be seen that the vehicle wheel 12 can be driven by the output 38 via the output shaft 36, and the vehicle wheel 14 can be driven by the output 42 via the output shaft 40. The output shafts 36 and 40 are arranged coaxially to each other and can thus be rotated about a common output shaft axis of rotation relative to the housing 24.

In the first embodiment, the output shaft 36, and thus the output 38, is assigned an intermediate element designed as an intermediate gear wheel 44, which is also referred to simply as an intermediate gear. The output shaft 36 is thus connected to the output 38 via the intermediate gear 44, in particular permanently, in a torque-transmitting manner. A reversal of the direction of rotation of the output shaft 36 relative to the output 38 belonging to the output shaft 36 can be effected by means of the intermediate gear 44, such that when the planetary gear is driven, the outputs 38 and 42 rotate in opposite directions about the planetary gear set axis of rotation relative to the housing 24, whereby or while the output shafts 36 and 40 rotate in the same direction about the output shaft axis of rotation relative to the housing 24, so that the vehicle wheels 12 and 14 also rotate in the same direction. As a result, the planetary gear set 26 functions both as a differential, which permits different speeds of the vehicle wheels 12 and 14, in particular when the motor vehicle is cornering, and in particular the vehicle wheels 12 and 14 can be driven or are driven via the planetary gear set 26 by means of the electric machine 18. Furthermore, the planetary gear set 26 can be used as a gear unit or gear stage in order to realize a change in speed, in particular a reduction in speed, in particular such that when the vehicle wheels 12 and 14 are driven by means of the rotor 22, which rotates at an input speed relative to the housing 24 about the machine's axis of rotation, the output shafts 36 and 40 rotate at a respective output speed relative to the housing 24 about the output shaft axis of rotation, wherein preferably the output speed is lower than the drive speed, and wherein preferably the output shafts 36 and 40 rotate at the same output speed and in particular in the same direction, in particular in a normal operating mode.

It can be seen from FIG. 1 that in the first embodiment, the output shaft 36 is connected to the output 38 via a first spur gear stage 46 in a torque-transmitting manner, in particular permanently. The output shaft 40 is connected, in particular permanently, in a torque-transmitting manner to the output 42 via, in particular exactly, one second spur gear stage 49. In the first embodiment, the first spur gear stage 46 comprises a first spur gear 48, which is connected to the output 38 in a torque-transmitting, in particular permanent, and in particular in a torsionally rigid manner, and the intermediate gear 44 as the second spur gear, which meshes with the spur gear 48. A third spur gear stage 50 is also provided, via which the output shaft 36 is connected to the output 38 in a torque-transmitting manner, in particular permanently. The third spur gear stage 50 comprises the intermediate gear 44 (second spur gear) and a third spur gear 52, which meshes with the intermediate gear 44. The third spur gear 52 is connected to the output shaft 36 in a torque-transmitting manner, in particular permanently, and in particular in a torsionally rigid manner. The second spur gear stage 49 has a fourth spur gear 54, which is connected to the output 42 in a torque-transmitting, in particular permanently, and in particular in a torsionally rigid manner. Furthermore, the spur gear stage 49 comprises a fifth spur gear 56, which meshes with the spur gear 54 and is in particular permanently connected to the output shaft 40 in a torque-transmitting, in particular torsionally rigid, manner.

In the first embodiment, the ring gear 30 or a ring gear shaft 58 connected to the ring gear 30, in particular permanently, in a torsionally rigid manner, is designed as a hollow shaft through which the planet carrier 32 or a planet carrier shaft 60 connected to the planet carrier 32, in particular permanently, in a torsionally rigid manner, passes. For example, the spur gear 54 is thereby connected to the planet carrier shaft 60 in a torsionally rigid manner, in particular permanently. Thus, as viewed in the axial direction of the planetary gear set 26, the spur gear stage 49 is arranged on a first side of the sun gear 28, in particular the spur gear stages 46 and 50, while the electric machine 18 is arranged on a second side of the sun gear 28 facing away from the first side in the axial direction of the planetary gear set 26, or while the sun gear 28 is arranged on a second side of the spur gear stages 46 and 50 facing away from the first side as viewed in the axial direction of the planetary gear set 26. In other words, the spur gear stages 46 and 50 are arranged between the spur gear stage 49 and the sun gear 28 when viewed in the axial direction of the planetary gear set 26. The electric machine 18 is thereby arranged on the side of the vehicle wheel 12, and the spur gear stage 49 is arranged on the side of the vehicle wheel 14.

Figure 2:
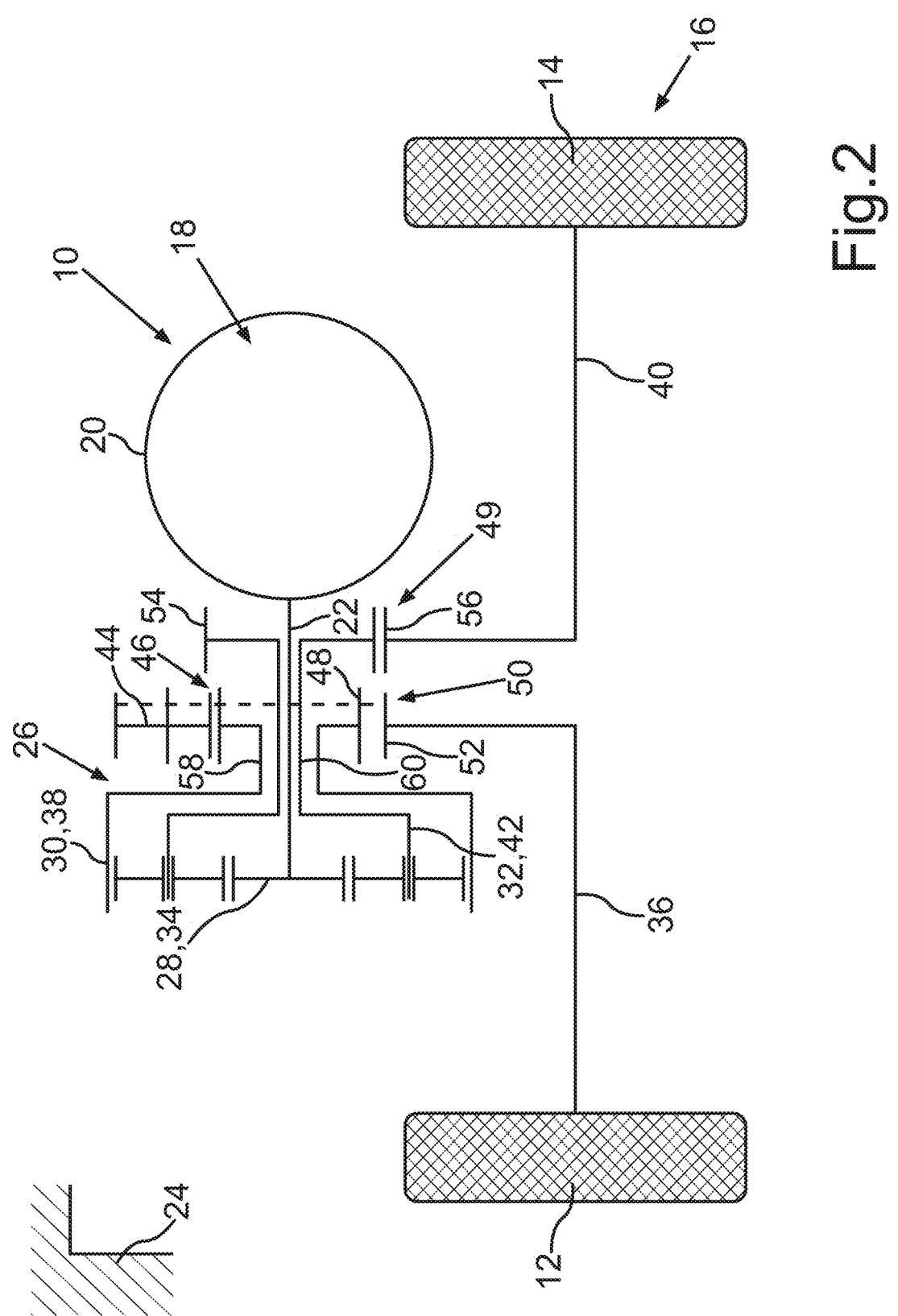
FIG. 2 a schematic representation of a second embodiment of the axle drive.

FIG. 2 shows a second embodiment of the axle drive 10. In the second embodiment, the spur gear stages 46, 49 and 50 and the electric machine 18 are arranged on the same side of the planetary gear set 26 as viewed in the axial direction of the planetary gear set 26, such that the spur gear stage 49 is arranged between the electric machine 18 and the spur gear stage 46 or 50, as viewed in the axial direction of the planetary gear set 26, and the spur gear stage 46 or 50 are or is arranged between the spur gear stage 49 and the planetary gear set 26.

It can also be seen that the direction of rotation of the second output 42 is not reversed, so that the outputs 38 and 42 rotate in opposite directions, but the output shafts 36 and 40 rotate in the same direction when the planetary gear and, via this, the output shafts 36 and 40 are driven by the electric machine 18.

FIG. 3 shows a schematic representation of a speed distribution when the motor vehicle is traveling straight ahead in the longitudinal direction of the vehicle. A ring gear rotation speed of the ring gear 30 and a direction of rotation of the ring gear 30 are illustrated by an arrow 62. A carrier speed of the planet carrier 32 and a direction of rotation of the planet carrier 32 are illustrated by an arrow 64. In addition, the aforementioned drive speed of the drive unit 34 (sun gear 28) and a direction of rotation of the drive unit 34 are illustrated by an arrow 66. As can be seen particularly clearly from FIGS. 1 to 3, the planetary gear set 26 also has planet gears 68, which, in particular all of them, are designed as unstepped planet gears. The respective planet gear 68 meshes with the sun gear 28 (drive unit 34). In addition, the respective planet gear 68 meshes with the ring gear 30 (output 38). The respective planet gear 68 is also rotatably mounted on the planet carrier 32 (output 42).

FIG. 4 shows a speed distribution of the planetary gear set 26 in a left-hand bend, i.e., when the motor vehicle is driven through a left-hand bend. For example, in a left-hand bend, the vehicle wheel 12 is the vehicle wheel on the inside of the bend, so that the vehicle wheel 14 is the vehicle wheel on the outside of the bend. FIG. 5 also shows a speed distribution of the planetary gear set 26 during a right-hand bend, i.e., when the motor vehicle is driven through a residual bend. In the right-hand bend, for example, the vehicle wheel 14 is the vehicle wheel on the inside of the bend, while the vehicle wheel 12 is the vehicle wheel on the outside of the bend. A differential function of the planetary gear set 26 can be seen particularly clearly in FIGS. 3 to 5. In other words, it can be recognized particularly well from FIGS. 3 to 5 that, in particular when the motor vehicle is cornering, the planetary gear acts as a differential, i.e., as a differential gear. In particular, for example, the drive speed of the drive unit 34 (sun gear 28) is the same for both the left-hand bend illustrated in FIG. 4 and the right-hand bend shown in FIG. 5.

Figure 6:
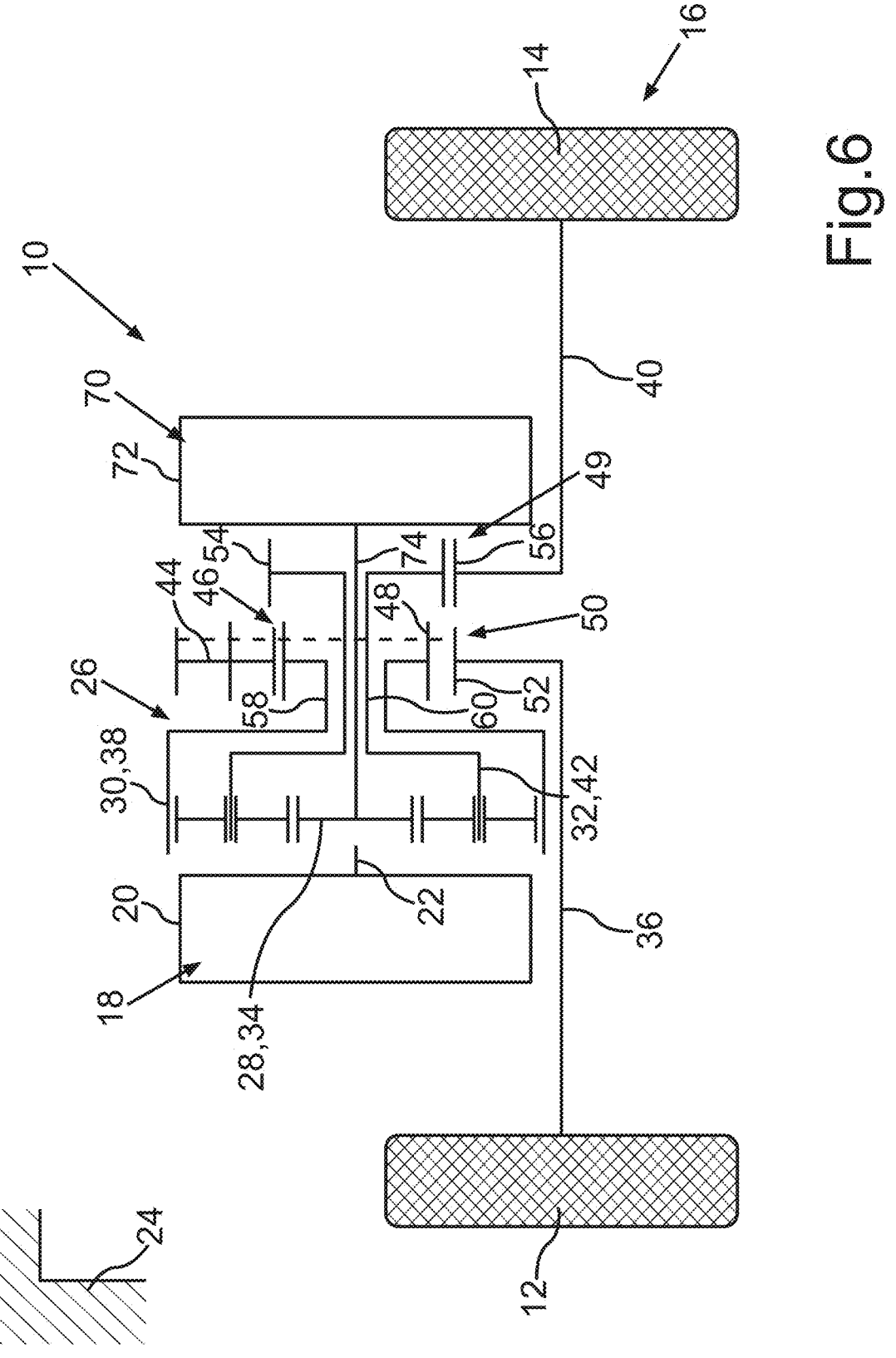
FIG. 6 a schematic representation of a third embodiment of the electric axle drive.

FIG. 6 shows a schematic representation of a third embodiment of the electric axle drive 10. In the third embodiment, the electric axle drive 10 has a second electric machine 70, which has a second stator 72 and a second rotor 74. The second rotor 74 can be driven by means of the second stator 72 and therefore can be rotated about a second machine's axis of rotation relative to the stator 72. It is conceivable that the machine's axes of rotation run parallel to each other and are spaced at a distance from each other. It is also conceivable that the machine's axes of rotation coincide so that, for example, the electric machines 70 and 18 can be arranged coaxially to one another. Other positions or orientations of the electric machines 18 and 70 and thus of their rotors 22 and 74 are fundamentally conceivable. The electric machine 70 can provide second drive torques via its second rotor 74, so that, for example, in the aforementioned normal operating mode, the vehicle wheels 12 and 14 are driven, in particular simultaneously, by means of both electric machines 18 and 70, such that the output shafts 36 and 40, and thus in particular also the vehicle wheels 12 and 14, rotate in the same direction, i.e., in the same direction of wheel rotation or direction of output shaft rotation. For example, in order to be able to drive the planetary gear and via this the vehicle wheels 12 and 14 by means of both electric machines 18 and 70, in particular in the normal operating mode, in particular in order to drive the motor vehicle forwards, in particular straight ahead, the second rotor 74, for example, can be or is connected to the drive unit 34 (sun gear 28), in particular permanently, in a torque-transmitting manner, so that the second drive torques which can be or are provided by the second rotor 74, i.e., by the electric machine 70 via the second rotor 72, can be introduced into the planetary gear set 26 via the drive unit 34.

Alternatively, or in addition, the electric axle drive 10 is designed, for example, to operate the electric machines 18 and 70 in such a way, in particular to transmit the drive torques, in particular the second drive torques, which are provided or can be provided by one of the rotors 22 and 74, in particular by the rotor 74, to at least one of the output shafts 36 and 40, in such a way that when the output shafts 36 and 40 and thus the vehicle wheels 12 and 14 are driven by the other rotor 74, 22, in particular by the rotor 22, the output shafts 36 and 40 rotate in opposite directions, i.e., the output shafts 36 and 40 rotate in opposite directions. In particular, the electric axle drive can, for example, be operated optionally in a first cornering mode or in a second cornering mode, the respective cornering mode being a respective torque distribution mode. In the first cornering mode, for example, the drive torques provided by the one of the rotors 22, 74 are transmitted to the at least one output shaft 36, 40 in such a way that, for example, the output shaft 36 and thus the vehicle wheel 12 rotate about the output shaft axis of rotation in a first wheel direction of rotation or output shaft direction of rotation, while the output shaft 40 and thus the vehicle wheel 14 rotate in a second wheel direction of rotation or output shaft direction of rotation, the second output shaft direction of rotation or the second wheel direction of rotation being opposite to the first output shaft direction of rotation or first wheel direction of rotation. In the normal operating mode and/or when the motor vehicle is driven forwards, in particular straight ahead, and is driven by at least one of the electric machines 18 and 70, or simultaneously by both electric machines 18 and 70, the output shafts 36 and 40 and thus the vehicle wheels 12 and 14 rotate in the first output shaft direction of rotation, for example, and thus in the first wheel direction of rotation. In the second cornering mode, for example, the drive torques that can be provided or are provided by the one of the rotors 22, 74 are transmitted to the at least one output shaft 36, 40 in such a way that the output shaft 40 and thus the vehicle wheel 14 rotate in the first output shaft direction of rotation and thus in the first wheel direction of rotation not wheel axis of rotation, while the output shaft 36 and thus the vehicle wheel 12 rotate in the second output shaft direction of rotation or in the second wheel direction of rotation. The first cornering mode is performed or set, for example, when the motor vehicle is taking a right-hand bend, i.e., driving through a right-hand bend, so that the vehicle wheel 12 is the vehicle wheel on the outside of the bend and the vehicle wheel 14 is the vehicle wheel on the inside of the bend. The second cornering mode is performed or set, for example, when the motor vehicle is negotiating a left-hand bend, i.e., driving through a left-hand bend, with the vehicle wheel 12 being the vehicle wheel on the inside of the bend and the vehicle wheel 14 being the vehicle wheel on the outside of the bend. Thus, for example, it is provided in the respective cornering mode that the respective vehicle wheel on the inside of the bend is rotated backwards and thus undergoes a reversal in the direction of rotation compared to the normal operating mode, i.e., compared to an operating state in which the output shafts 36 and 40 and thus the vehicle wheels 12 and 14 rotate simultaneously and thereby forwards, for example in order to drive the motor vehicle forwards, in particular straight ahead. To realize the reversal of the direction of rotation, for example, the second rotor 74 can be or is connected to the drive unit 34 or to one of the outputs, and therefore is or can be connected to the drive unit 34 or to, in particular exactly, one of the outputs 38 and 42 in a torque-transmitting manner, in particular in a torsionally rigid manner. This means, for example, that a load point can be raised on one of the electric machines 18 and 70, especially in the case of small lines, and in particular that the electric machine 70 or 18 can be operated in a generator mode at the same time and thus absorb power.

In more general terms, alternatively or in addition, the electric axle drive 10 is designed to operate one of the electric machines 18 and 70, in particular the electric machine 70, and thus one of the rotors 22 and 44, in particular the rotor 74, and thus to influence the planetary gear (planetary gear set 26) in such a way that when the vehicle wheels 12 and 14 and thus the output shafts 36 and 40 are driven by the other electric machine 70, 18, in particular by the electric machine 18, and thus by the other rotor 74, 22, in particular by the rotor 22, the output shafts 36 and 40 rotate in opposite directions, in particular around the output shaft axis of rotation and/or relative to the housing 24. In the third embodiment, the rotor 74 is connected to the sun gear 28 in a torque-transmitting manner, in particular permanently, and in particular in a torsionally rigid manner.

Figure 7:
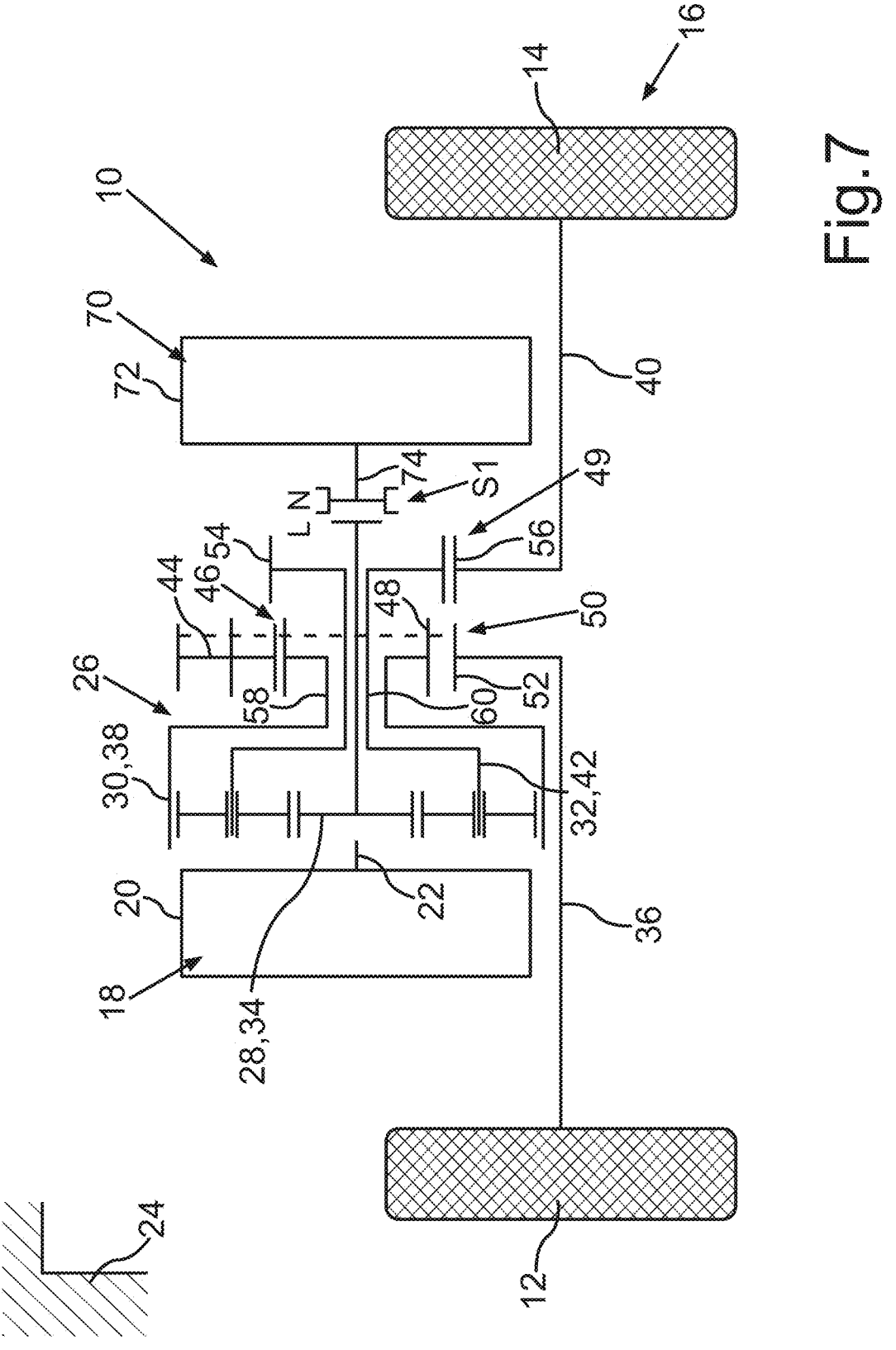
FIG. 7 a schematic representation of a fourth embodiment of the electric axle drive.

FIG. 7 shows a fourth embodiment of the axle drive 10. In the fourth embodiment, a switching element S1 is provided which can be switched between at least two switching states L and N, in particular can be moved relative to the housing 24 and/or translationally. In the fourth embodiment, the switching element S1 is associated with the electric machine 70, whereby the previous and following explanations regarding the switching element S1 in relation to the electric machine 70 can also be readily applied with respect to the electric machine 18 and vice versa. Thus, the switching element S1 could alternatively be assigned to the electric machine 18. Furthermore, it is conceivable that a switching element such as the switching element S1 is also assigned to the electric machine 18.

The switching element S1 can be switched between two switching states L and N, in particular it can be moved relative to the housing 24 and/or translationally. In the switching state L, the rotor 74 is connected to the sun gear 28 (drive unit 34) in a torsionally rigid manner by means of the switching element S1. In the switching state N, the rotor 74 is decoupled from the sun gear 28, so that the switching element S1 allows relative rotations between the rotor 74 and the sun gear 28, in particular around the planetary gear set axis of rotation, and in particular no torques can be transmitted between the sun gear 28 and the rotor 74. In this way, two-motor operation can be realized in the switching state L, which can be used, for example, to represent a first variant of the normal operating mode. In the two-motor mode, the output shafts 36 and 40 and thus the vehicle wheels 12 and 14 can be driven, in particular simultaneously, by means of both electric machines 18 and 70. In the switching state N, for example, single-motor operation is possible, which is, for example, a second variant of the normal operating mode. In the single-motor mode, the output shafts 36 and 40 and thus the vehicle wheels 12 and 14 are driven exclusively by means of the electric machine 18 with respect to the electric machines 18 and 70. The output shafts 36 and 40, and thus preferably also the vehicle wheels 12 and 14, thereby preferably rotate in the same direction in the single-motor mode and in the two-motor mode. The switching element S1 makes it possible, in particular, to use only one of the electric machines 18 and 70, and in particular the electric machine 18, to drive the vehicle wheels 12 and 14, for example in partial load operation. Very preferably, the switching element S1 is a positive-locking switching element, in particular a claw switching element, by means of which the rotor 74 is positively connected to the sun gear 28 in a torsionally rigid manner in the switching state L. In particular, for example, the electric machine 70 or its rotor 74 is stationary in the switching state N, so that it is preferably not driven. The planetary gear set 26 as a differential distributes the torques to or on the left-hand vehicle wheel 12 and the right-hand vehicle wheel 14. Since the torques on a classic planetary gear set do not behave in the same way and have different directions of rotation in this combination, a reversal of the direction of rotation is used in or on a torque path, which is or can be effected in the present case by the intermediate gear 44. In the present case, the reversal of the direction of rotation is provided on the planet carrier 32, but it would alternatively be possible on the ring gear 30. Both positions are possible with regard to connecting the respective electric machine 18 or 70, in particular to effect the respective cornering mode. In other words, it is conceivable to connect the electric machine 18 or 70 to the output 38 or the output 42 to realize the respective cornering mode. To effect the cornering mode, for example, only the direction of rotation of the respective electric machine 18, 70 causing the cornering mode is adjusted. Torque compensation, for example to achieve a distribution of the respective drive torque, in particular exactly half of the torque, to the output shafts 36 and 40, is achieved, for example, via different transmission stages between the respective output shaft 36, 40 and the planetary gear set 26, for example by the spur gear stages 46 and 50 between the planetary gear set 26 and the output shaft 36 and by the spur gear stage 49 between the output shaft 40 and the planetary gear set 26.

As the intermediate gear 44 is used to reverse the direction of rotation, this intermediate gear 44 is suitable as an additional torque path in order to be able to realize the cornering mode or both cornering modes. The torque distribution of 50/50 can be changed by intervening only on one torque path or on one side of the wheel. For example, a braking torque on the intermediate gear 44 reduces the torque on this gear. A drive torque increases the wheel torque on the wheel of the intermediate gear. The wheel torque can even be driven torque-free or by the drive unit in the opposite direction. The wheels can be driven in different directions with this torque interface. This results in the vehicle's bend radius being reduced as the wheel on the inside of the bend moves backwards and the wheel on the outside of the bend moves or rotates forwards.

Figure 8:
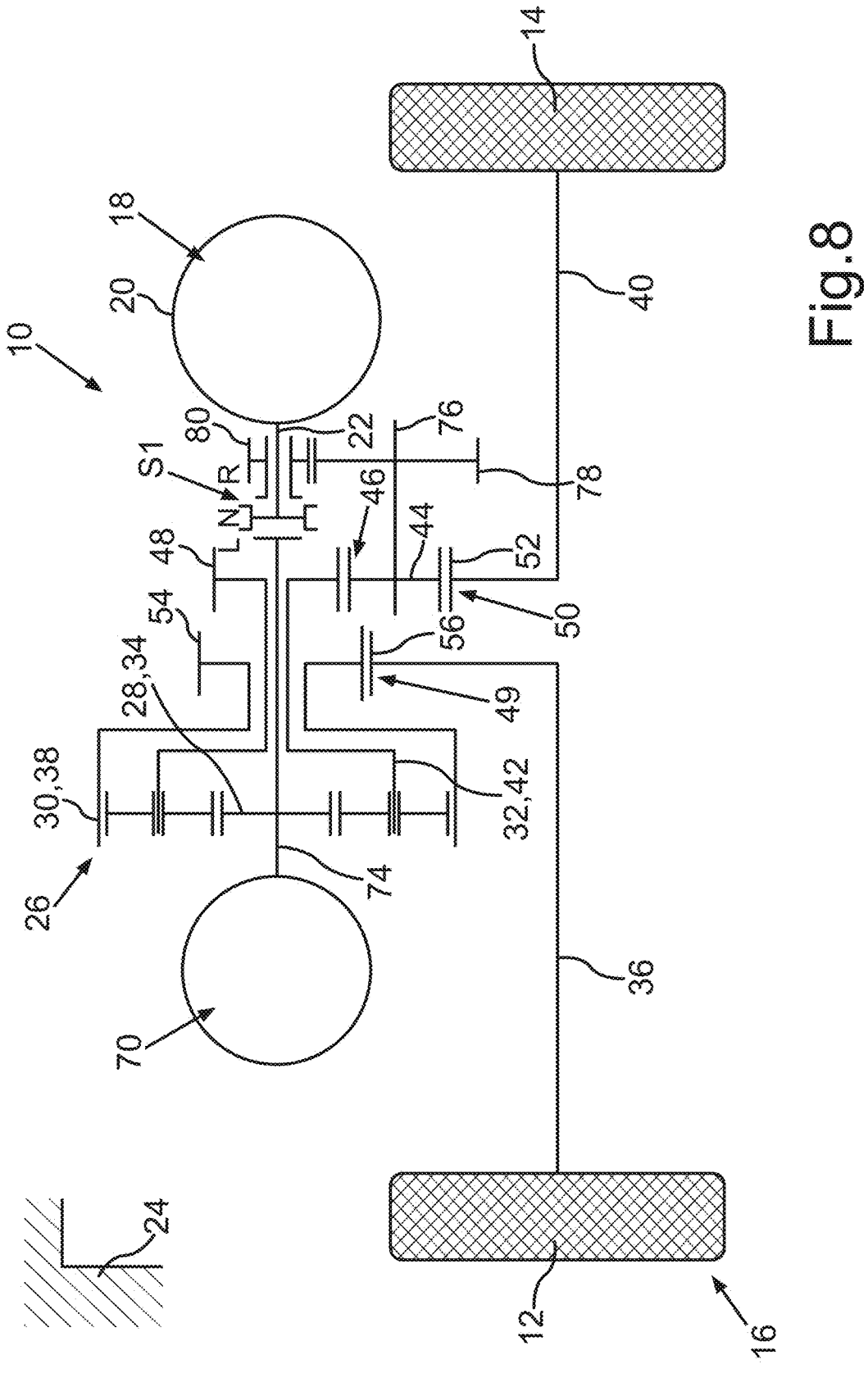
FIG. 8 a schematic representation of a fifth embodiment of the electric axle drive.

Finally, FIG. 8 shows a fifth embodiment. In the fifth embodiment, the switching element S1 can be switched, in particular moved, to a third switching state R. In the third switching state, the rotor 22 of the electric machine 18 is coupled to the intermediate gear 44, bypassing the torque transmission of the drive unit 34. For this purpose, the intermediate gear 44 is connected, in particular permanently, in a torsionally rigid manner to an intermediate shaft 76, to which a gear wheel 78 designed in particular as a spur gear is also connected, in particular permanently, in a torsionally rigid manner. The gear wheel 78 meshes with a gear wheel 80, which is designed as a spur gear, for example. In the third switching state, the rotor 22 is connected to the gear wheel 80 in a torsionally rigid manner by means of the switching element S1 and is thus connected to the intermediate gear 44 via the gear wheels 78 and 80 and via the intermediate shaft 76 in a torque-transmitting manner. In the switching state L and in the switching state N, the rotor 22 is decoupled from the gear wheel 80. In particular in the switching state R, the rotor 22 and thus the electric machine 18 can influence the intermediate gear 44 via the gear wheels 78 and 80 and via the intermediate shaft 76 and, for example, via this the output 42 and thus the planetary gear set 26 in such a way that when the electric machine 70 drives the output shafts 36 and 40 and thus the vehicle wheels 12 and 14 via the rotor 74, the output shafts 36 and 40 and thus the vehicle wheels 12 and 14 rotate in opposite directions, so that the first cornering mode or second cornering mode can be carried out as desired. Thus, the switching state R is provided for selectively executing the respective cornering mode.

LIST OF REFERENCE SIGNS

10 Electric axle drive
12 Vehicle wheel
14 Vehicle wheel
16 Axle
18 Electric machine
20 Stator
22 Rotor
24 Housing
26 Planetary gear set
28 Sun gear
30 Ring gear
32 Planet carrier
34 Drive unit 36 Output shaft
38 First output
40 Output shaft
42 Second output
44 Intermediate gear
46 Spur gear stage
48 Spur gear
49 Spur gear stage
50 Spur gear stage
52 Spur gear
54 Spur gear
56 Spur gear
58 Ring gear shaft
60 Planet carrier shaft
62 Arrow
64 Arrow
66 Arrow
68 Planet gear
70 Second electric machine
72 Second stator
74 Second rotor
76 Intermediate shaft
78 Gear wheel
80 Gear wheel
L Switching state
N Switching state
R Switching state
S1 Switching element

The invention claimed is:

1. Electric axle drive (10) for an axle (16) of a motor vehicle comprising two vehicle wheels (12, 14), having one or more electric machine (18) which has a stator (20) and a rotor (22), and having a planetary gear set (26) which has a ring gear (30), a planet carrier (32) and a sun gear (28) as a drive unit (34), via which drive torques which can be provided by the rotor (22) can be introduced into the planetary gear set (26) in order to drive the vehicle wheels (12, 14), wherein:
  a first output shaft (36), from which a first of the vehicle wheels (12, 14) can be driven, is connected in a torque-transmitting manner to the ring gear (30) as a first output (38) of the planetary gear set (26) associated with the first output shaft (36),
  a second output shaft (40), from which the second vehicle wheel (14) can be driven, is connected in a torque-transmitting manner to the planet carrier (32) as a second output (42) of the planetary gear set (26) associated with the second output shaft (40), from which the respective output torques resulting from the respective drive torques can be dissipated from the planetary gear set (26) for driving the vehicle wheels (12, 14), and
  one of the output shafts (36, 40) is connected in a torque-transmitting manner to the output (38, 42) of the planetary gear set (26) belonging to the one output shaft (36, 40) via an intermediate element (44), by means of which a reversal of the direction of rotation of the one output shaft (36, 40) can be effected relative to the output (38, 42) of the planetary gear set (26) belonging to the one output shaft (36, 40), characterized in that a second rotor (74) can be connected to the intermediate element (44) in a torque-transmitting manner by means of a switching element (S1), bypassing the drive unit (34) of the planetary gear set (26).

2. Electric axle drive (10) according to claim 1, characterized in that
the intermediate element (44) is designed as an intermediate gear (44).

3. Electric axle drive (10) according to claim 1, characterized in that:
  the one output shaft (36, 40) is connected in a torque-transmitting manner to the output (38, 42) of the planetary gear set (26) belonging to the one output shaft (36, 40) via a first spur gear stage (46), and
  the other output shaft (40, 36) is connected in a torque-transmitting manner to the output (38, 42) of the planetary gear set (26) belonging to the other output shaft (36, 40) via a second spur gear stage (49).

4. Electric axle drive (10) according to claim 2, characterized in that
the first spur gear stage (48) has a first spur gear (46) connected in a torque-transmitting manner to the output (38, 42) of the planetary gear set (26) belonging to the one output shaft (36, 40) and the intermediate gear (44) meshing with the first spur gear (48) as a second spur gear, which meshes with a third spur gear (52) connected in a torque-transmitting manner to the one output shaft (36, 40) of a third spur gear stage (50) comprising the second spur gear and the third spur gear (52), via which the one output shaft (36, 40) is connected in a torque-transmitting manner to the output (38, 42) of the planetary gear set (26) belonging to the one output shaft (36, 40).

5. Electric axle drive (10) according to claim 2, characterized by
a second electric machine (70) comprising a second stator (72) and the second rotor (74), from which second drive torques can be provided.

6. Electric axle drive (10) according to claim 5, characterized in that
the second rotor (74) can be or is connected in a torque-transmitting manner to the drive unit (34) of the planetary gear set (26), via whose drive unit (34) the second drive torques which can be provided by the second rotor (74) can be introduced into the planetary gear set (26).

7. Electric axle drive (10) according to claim 5, characterized in that
the electric axle drive (10) is designed to operate one of the electric machines (18, 70) and thereby influence the planetary gear set (26) in such a way that, when the output shafts (36, 40) are driven by the other electric machine (70, 18), the output shafts (36, 40) rotate in the opposite direction.

8. Electric axle drive (10) according to claim 5, characterized by
the switching element (S1), by means of which the second rotor (74) can be connected in a torque-transmitting manner to the drive unit (34) of the planetary gear set (26).

9. Motor vehicle, with at least one electric axle drive (10) according to claim 5.

* * * * *